No. 639,430. Patented Dec. 19, 1899.
F. J. PETERSEN & W. C. EBERHARDT.
CASH REGISTER.
(Application filed May 20, 1896.)
(No Model.) 6 Sheets—Sheet 1.

WITNESSES
Geo. W. Young
Arthur Goetzmann

INVENTORS,
Fred. J. Petersen and
William C. Eberhardt,
BY John E. Wiles
ATTORNEY.

THE NORRIS PETERS CO., PHOTO-LITHO., WASHINGTON, D. C.

No. 639,430. Patented Dec. 19, 1899.
F. J. PETERSEN & W. C. EBERHARDT.
CASH REGISTER.
(Application filed May 20, 1896.)
(No Model.) 6 Sheets—Sheet 2.

No. 639,430. Patented Dec. 19, 1899.
F. J. PETERSEN & W. C. EBERHARDT.
CASH REGISTER.
(Application filed May 20, 1896.)
(No Model.) 6 Sheets—Sheet 4.

No. 639,430. Patented Dec. 19, 1899.
F. J. PETERSEN & W. C. EBERHARDT.
CASH REGISTER.
(Application filed May 20, 1896.)
(No Model.) 6 Sheets—Sheet 5.

WITNESSES.
Geo. W. Young
Arthur Gockmann

INVENTORS,
Fred J. Petersen and
William C. Eberhardt,
BY John E. Miles,
ATTORNEY.

No. 639,430. Patented Dec. 19, 1899.
F. J. PETERSEN & W. C. EBERHARDT.
CASH REGISTER.
(Application filed May 20, 1896.)

(No Model.) 6 Sheets—Sheet 6.

WITNESSES
Josephine Lucas.
Arthur Goetzmann

INVENTORS,
Fred J. Petersen and
William C. Eberhardt,
BY John E. Wiles,
ATTORNEY.

UNITED STATES PATENT OFFICE.

FRED J. PETERSEN AND WILLIAM C. EBERHARDT, OF PLYMOUTH, WISCONSIN, ASSIGNORS TO THE PERFECTION CASH REGISTER COMPANY, OF SAME PLACE.

CASH-REGISTER.

SPECIFICATION forming part of Letters Patent No. 639,430, dated December 19, 1899.

Application filed May 20, 1896. Serial No. 592,372. (No model.)

*To all whom it may concern:*

Be it known that we, FRED J. PETERSEN and WILLIAM C. EBERHARDT, citizens of the United States, residing at Plymouth, county of Sheboygan, State of Wisconsin, have invented a certain new and useful Improvement in Cash-Registers; and we do declare the following to be a full, clear, and exact description of the invention, such as will enable others skilled in the art to which it pertains to make and use the same, reference being had to the accompanying drawings, which form a part of this specification.

Our invention relates to new and useful improvements in cash-registers; and it consists in the matters hereinafter described, and pointed out in the appended claims.

The object of our invention is to provide a simple and accurate form of cash-register capable of use in connection with a variety of business transactions and capable of preserving separate and accurate registrations of said transactions.

Our present invention relates more particularly to cash-registers of a general construction similar to that illustrated and described in United States Patent No. 546,342, granted on September 17, 1895, to F. J. Petersen, W. C. Eberhardt, and G. A. Piper, and said improvements are designed to simplify the construction of the registering and adding mechanism and to provide a construction of said parts which shall be less liable to wear or to get out of order.

The various features of our invention will be hereinafter fully described with reference to the accompanying drawings, in which—

In the aforesaid prior patent the indicating mechanism which registers the amounts of the several transactions is actuated by means of a pivoted arm having at its pivotal support a pinion operatively engaging with a movable rack-bar, said arm carrying at its free end a pawl or dog for engagement with ratchet-teeth upon the periphery of the indicating dial or wheel. The adjustment of the indicating mechanism in the aforesaid contruction is effected by a variable movement of the rack-bar and the pivoted arm, the levers for indicating transactions of different amounts having a greater or less degree of free movement before coming into engagement with the movable bar. We have found in practice, however, that this construction is subject to quite rapid wear, and that its operation is hereby rendered somewhat uncertain and unsatisfactory. In our present form of construction we employ substantially the same form of keys and levers as illustrated in the aforesaid prior patent, but the mode of operation of the same is somewhat different, as is also the construction of the registering mechanism and the devices directly connected therewith.

Referring by letter to the drawings, A designates the casing of our improved cash-register, having a horizontally-extended lower portion A', arranged to contain the cash-drawer A², that opens automatically in the manner hereinafter described. Above the cash-drawer, in the lower extended part of the casing, is a compartment A³, that is closed by a hinged lid A⁴, which serves as a cashier's desk and is held closed when necessary by means of a suitable lock $a$. This compartment may be equipped with any suitable memorandum devices—such, for instance, as the rollers and traveling paper strips shown and described in the aforesaid patent; but this feature forms no part of our present invention, and it is not necessary, therefore, to describe the same in detail or to illustrate it in the drawings.

A plurality of operating-levers B B are arranged to extend outward through the casing and are provided with flat places $b\,b$ to receive numerals or other characters designating the amounts or other characteristics of the transactions registered. Each of these levers B B is pivotally supported within the casing as at $b'$, and is provided with a segmental gear B', engaging with a rack-bar C, which latter is affixed to the end of a vertically-movable bar C', adapted for engagement with the register-actuating mechanism. It follows from this construction that by a downward and outward movement of one of the levers B B the segmental gear and the rack-bar may be actuated to raise the vertically-movable bar C' in an obvious manner.

Figure 2:
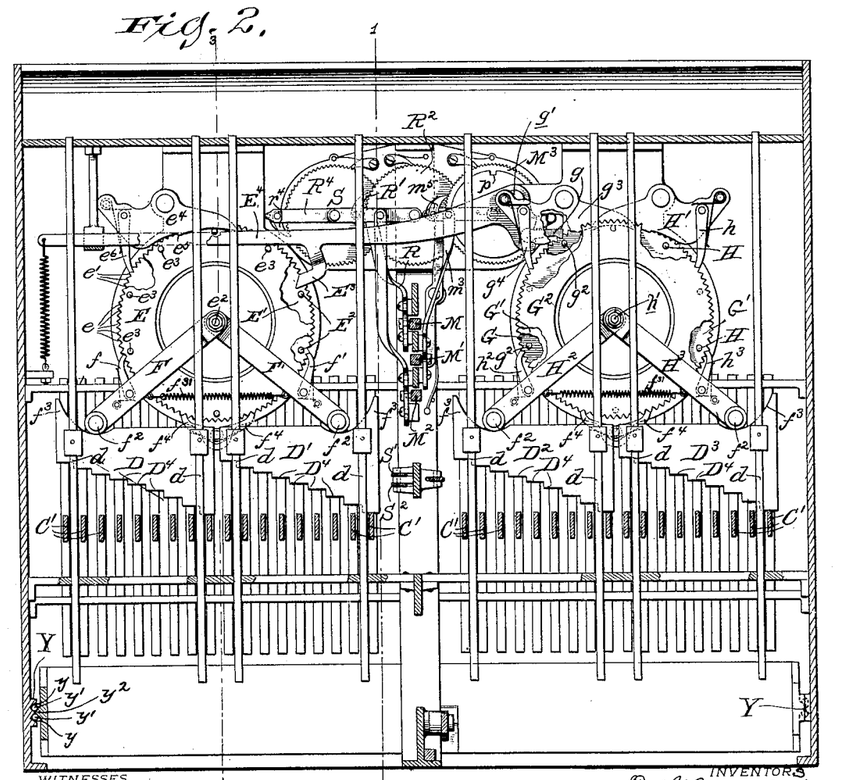
Fig. 2 is a transverse vertical sectional view of the same, taken on line 2 2 of Fig. 1.

As shown more particularly in Fig. 2, stepped plates D D' D² D³ are provided within the casing and arranged to move vertically upon guide-rods $d\,d$, the lower edges of said stepped plates being provided with shoulders or steps D⁴ D⁴ and adapted for engagement with the several bars C' C' upon an upward movement of the latter in an obvious manner. The steps or shoulders D⁴ D⁴ upon the plates D D' D² D³ are so disposed that the bar C' C' shall have a greater or less degree of free movement before coming into engagement with said steps or shoulders, so as to produce a correspondingly greater or less degree of vertical adjustment of said stepped plates, according to which of the bars C' is brought into engagement therewith, the movement of the actuating-levers B B being the same in every case.

Figures 1, 11, 12, 13, 14:
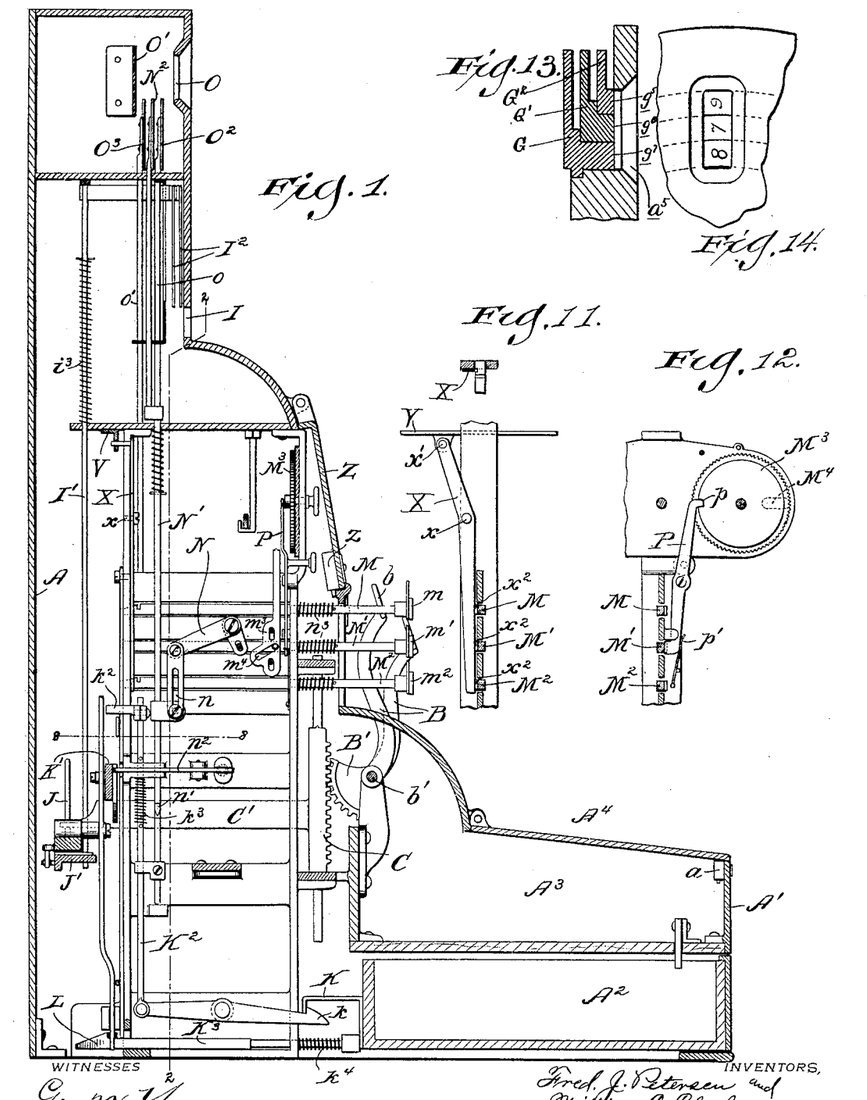
Figure 1 is a vertical sectional view of our improved cash-register, taken on line 1 1 of Fig. 2.
Fig. 11 is a detail sectional view of the mechanism for locking the push-bars which actuate the indicator devices for designating the character of the transaction.
Fig. 12 is a detail view, partly in section and partly in elevation, of one of the indicating-dials and the locking mechanism for securing the same against rotation.
Fig. 13 is a sectional view of a portion of one set of indicating-dials.
Fig. 14 is a face view of the same.

Indicating-disks E and E' are arranged to be operated by means of the stepped plates upon one side of the register and are provided upon their peripheries with ratchet-teeth $e\,e$ and $e'\,e'$, respectively. The indicators are placed on the front faces of the disks in a manner similar to that of the registering-disks, the arrangement of these disks being the same as that of the registering-disks with their indicators, as shown in Figs. 13 and 14, presently to be described. These disks are centrally supported upon an axis $e^2$ and are adapted for adjustment thereon, as will be presently described. Levers F F' are pivoted to the central support or axis of the disks E E', said levers carrying spring-pressed dogs or pawls $f\,f'$, respectively, for engagement with the ratchet-teeth $e\,e'$ upon said disks. At the free end of each of said levers is provided an antifriction-roller $f^2$, arranged to rest upon the upper edge of the stepped plate D or D', as the case may be. Adjacent to the outer ends of said stepped plates are provided upwardly-projecting extensions $f^3\,f^3$, having curved upper edges for engagement with said antifriction-rollers $f^2\,f^2$ in an obvious manner. Said curved upper edges are constructed upon eccentric curves so disposed that by an upward movement of one of the stepped plates the arm carrying the roller which engages with the respective curved edge will, as said roller approaches the outer end of said plate, be given a more extended upward movement and a corresponding adjustment of the toothed disk or wheel which is engaged by the pawl or dog carried thereby.

The stepped plate D is arranged so that upon its movement amounts in denominations of fractional currency from one cent to ten cents will be registered, the steps or shoulders being so disposed that with a full movement of the actuating-lever B the plate D will be raised to a point or degree sufficient to adjust the registering disk or wheel E one notch, while the lowermost step or shoulder—namely, that engaging with the lever for registering a nine-cent transaction—is arranged so that with the same movement of the actuating-lever the plate D will be raised and the arm F adjusted so as to carry the registering disk or wheel around for a space of nine notches.

For every ten notches upon the disk or wheel E is provided a pin or projection $e^3$, so arranged as to engage with a pivoted lever or plate $e^4$, having a shoulder or projection $e^5$ and carrying a pawl or dog $e^6$, which latter engages with the teeth of the disk or wheel E'. It follows from this construction that as often as one of the pins $e^3$ comes into engagement with the projection upon the lever or plate $e^4$ said plate will be oscillated, so that the pawl or dog carried thereby will adjust the second registering wheel or disk one notch. Upon the second registering disk or wheel E' are provided similar pins or projections E², said pins or projections being arranged at distances apart corresponding with the spaces occupied by ten teeth upon said disk, and said pins being arranged to engage with a projection E³ upon a carrying-over lever E⁴, which communicates motion with the registering disks or wheels at the other side of the machine.

The stepped plate D' is designed for registering amounts from ten cents to one dollar and is arranged to operate in substantially the same manner as described with relation to the plate D, the pawl $f'$, however, engaging with the teeth upon the disk or wheel E', each notch or tooth of which represents an amount equal to ten cents or ten times the amount registered by the adjustment of the disk or wheel E for the space of one notch. A suitable spring $f^{31}$ extends between the arms or levers F and F' and serves to normally hold their outer or free ends down and in engagement with the curved edges of the respective plates D and D'. Spring-dogs $f^4$ are arranged to engage with the respective disks or wheels, so as to lock the same against retrograde movement.

It follows from the described construction that by the actuation of the one-cent lever or key the first disk or the disk E will be adjusted a space corresponding with one notch or tooth of its periphery, while by the actuation of any other of the levers engaging therewith the adjustment of said disk or wheel will be in accordance with the relative position of the lever or key actuated. Each registering disk or wheel is (when the machine is designed for use in registering denominations of United States currency) provided with one hundred teeth upon its periphery, so that one hundred operations of the one-cent key will produce one complete rotation of said disk or wheel E, and by means of the lever-and-pawl connection $e^4$ $e^6$ the second disk or wheel E' will be adjusted one-tenth of a rotation, or a space of ten teeth, and by reason of the pins $E^2$ $E^2$ engaging with the carrying-over lever said lever will be actuated ten times for each complete revolution of the disk or wheel E'. It will be seen, therefore, that one complete rotation of the wheel E, producing the described one-tenth rotation of the wheel E', and thereby actuating the carrying-over lever $E^4$, will communicate a single adjustment of one tooth to the registering disk or wheel actuated by said carrying-over lever. It will also be seen that a complete rotation of the disk or wheel E' will actuate the carrying-over lever ten times, and that each movement of said lever represents the registration of one dollar, the complete rotation of the wheel E' representing ten dollars.

Upon the other side of the machine and connected with the carrying-over lever and with the registering mechanism, which will be presently described, are arranged a plurality of registering wheels or disks G, G', and $G^2$, respectively, the first of which is engaged by a pawl $g$, carried by the carrying-over lever $E^4$, which lever is pivotally supported at $g'$, adjacent to said disk. The disk or wheel G is provided with a series of equidistant pins or projections $g^2$ $g^2$, which are arranged to engage in the manner before described with a pivoted plate or lever $g^3$, carrying a pawl or dog $g^4$ for engagement with the second or intermediate disk or wheel G', said pins being so disposed as to produce an actuation of the plate or lever $g^3$ to adjust the intermediate disk or wheel a space of one tooth for every ten teeth to which the disk or wheel G has been adjusted. The intermediate disk or wheel G' is likewise provided with equidistant pins or projections H H for engagement with a pivoted plate or lever H', carrying a spring-pawl $h$, which in turn engages with the disk or wheel $G^2$. The pins H H are disposed similarly to the arrangement before described, so that for adjustment of ten teeth upon the intermediate wheel or disk G' or a complete rotation of the wheel or disk G the wheel or disk $G^2$ will be adjusted a single tooth. Pivoted arms or levers $H^2 H^3$ are connected with the axis $h'$ of the wheels or disks G G' $G^2$, and carry spring-pressed pawls $h^2 h^3$, respectively, for engagement with the teeth of the disks or wheels G and G', the free ends of said levers being provided with antifriction-rollers $f^2$ $f^2$ and the outer ends of the plates $D^2$ and $D^3$ being provided with upwardly-curved edges $f^3$ $f^3$, as before described. The construction and arrangement of the stepped plates $D^2$ and $D^3$ are the same as that described with reference to the plates D and D', and the disk or wheel G is arranged to register amounts in denominations of one dollar for each tooth upon its periphery, the intermediate disk or wheel to register in amounts of ten dollars for each tooth, and the disk or wheel $C^2$ to register amounts in denominations of one hundred dollars for each tooth upon its periphery. Suitable pawls or dogs $f^4$ $f^4$ are also arranged to hold the disks or wheels G and G' against retrograde movement, as before described, and the spring $f^{31}$ is engaged with the arms or levers $H^3 H^3$ and serves to hold their free ends down and in engagement with the curved edges of the plates $D^2$ and $D^3$. The bars C' C' are arranged to engage with and actuate the vertical movable plates $D^2$ and $D^3$ in the manner already described with reference to the plates D D', and the bars engaging the plate $D^2$ will cause the registration of amounts in denominations of one dollar and ranging from one to ten, while those engaging with the plate $D^3$ will cause the registration of amounts in denominations of ten dollars and ranging from ten to one hundred. It follows, therefore, from this construction that by the actuation of any one of the keys or levers the amount designated by said key or lever will be registered upon the appropriate disk or wheel, and that as often as the amount represented upon each disk or wheel reaches the limit of registration of said disk or wheel the total amount represented thereby will be transferred to the next succeeding disk or wheel, so that a continuous addition of all of the amounts of all of the transactions shall be made upon the registering mechanism. Take, for example, a transaction involving a sale of nineteen dollars and seventy-three cents. The operator presses the tens lever or key, the nine lever or key in the dollar-division, the seven lever or key in the dimes-division, and the three-key in the cents-division. If now the tens-registering disk has already been operated to register, say, sixty dollars, then the actuation of said disk by the tens lever will serve to adjust said disk so as to register seventy dollars, this being accomplished by the movement of said disk a single notch. If, now, the dollars-disk has already been operated to register say eight dollars, the additional adjustment of said disk to register the nine dollars will carry said disk past the limit of its registration, and will thus cause one of the pins thereon to engage with and actuate the ratchet mechanism and to thus communicate a rotation equal to one notch to the tens-disk, the excess—that is to say, seven dollars—being registered upon the dollars-disk. If now the dimes-disk has been previously operated to register, say, fifty cents, then a similar operation of said dimes-disk takes place, it being adjusted so as to pass the limit of its registration and transfer or communicate to the dollars-disk an adjustment of one notch, the excess or twenty cents still appearing upon the dimes-disk. Similarly, if the cents-disk has been previously actuated to register, say, nine cents the additional adjustment thereof of three notches designating the three cents will communicate an adjustment of one notch to the dimes-disk, and will thus register thereon an additional ten cents, while the excess or two cents remains upon the cents-disk. This operation of the registering devices serves to adjust the tens-disk one notch by the movement of the dollars-disk, to adjust the dollars-disk one notch by the described movement of the dimes-disk, and to likewise adjust the dimes-disk one notch by the described movement of the cents-disk, so that the record instead of being sixty-eight dollars and fifty-nine cents will now appear eighty-eight dollars and thirty-two cents.

In Figs. 13 and 14 I have indicated the construction of the indicating and registering disks or the portions thereof which are provided with the indicating-figures, said registering devices conveniently provided with forwardly-projecting concentric annular flanges or rings $g^5$, $g^6$, and $g^7$, having upon their forward faces the figures which designate the respective amounts, and the supporting-plate $A^5$ of the machine being provided with a slot or aperture $a^5$, arranged, as in said Figs. 13 and 14, to display the appropriate portions of the numbered faces of said flanges or rings.

As a further and separate improvement we provide suitable means for making duplicate or triplicate registrations, as may be desired, of transactions of like amounts, and for this purpose the indicating devices which display to the customer or cashier the amount which is registered by the operation of the keys or levers, and which will presently be described, are provided with suitable means for effecting a progressive or step-by-step adjustment of said indicating devices.

Figure 4:
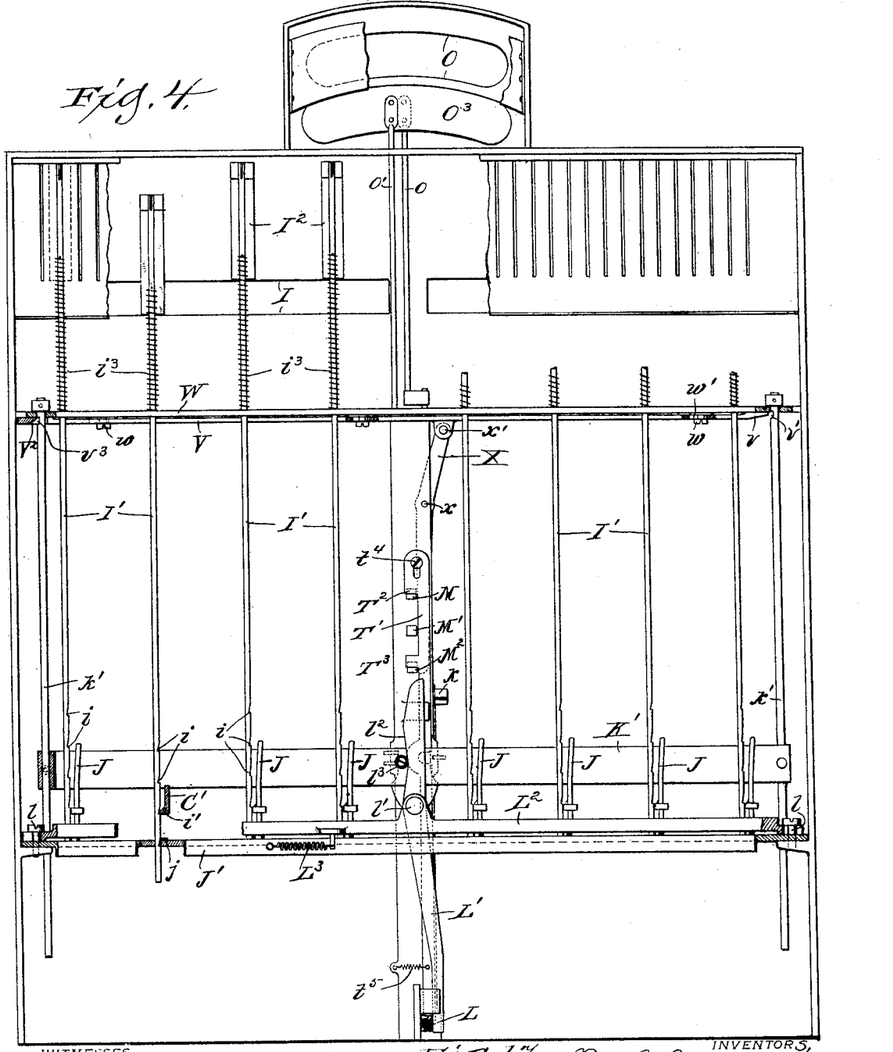
Fig. 4 is a rear elevation illustrating the construction of the indicating mechanism.
Figures 5, 6:
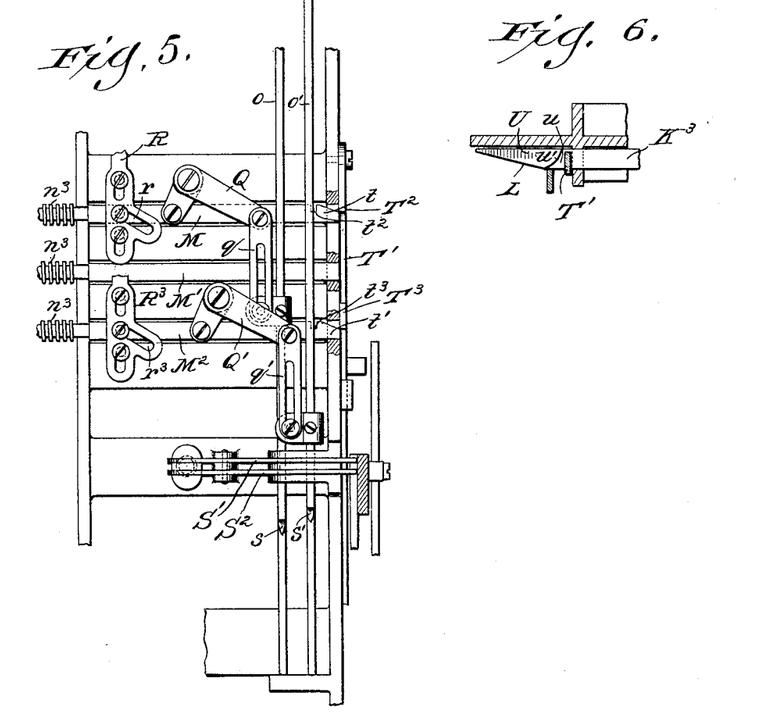
Fig. 5 is a detail view, partly in section and partly in elevation, of the mechanism for indicating the nature of the transaction to be recorded.
Fig. 6 is a detail view of a portion of the same.
Figure 7:
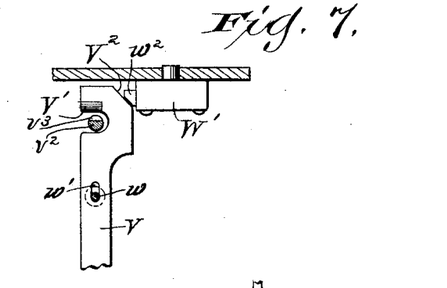
Fig. 7 is a detail view of the mechanism for locking the working parts of the register to prevent alteration of the records of transactions.
Figures 8, 9, 10:
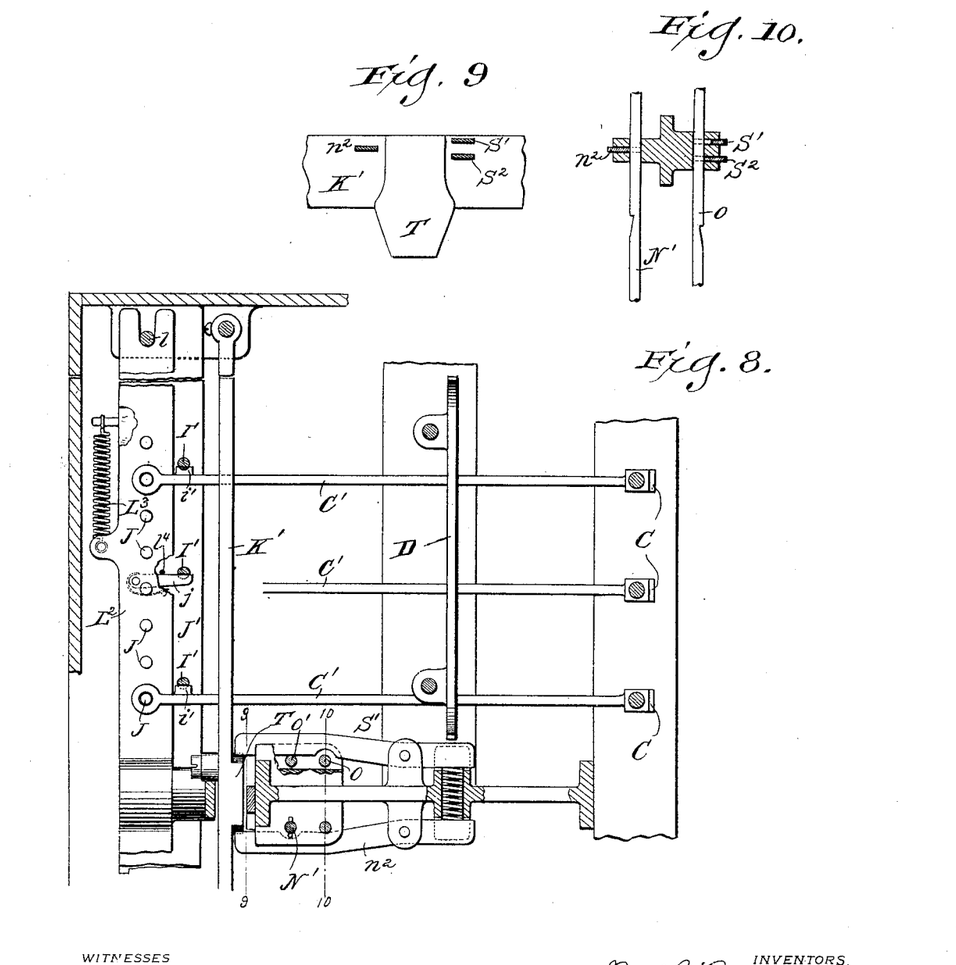
Fig. 8 is an enlarged sectional plan view taken on line 8 8 of Fig. 1.
Fig. 9 is a detail sectional view taken on line 9 9 of Fig. 8.
Fig. 10 is a similar view taken on line 10 10 of Fig. 8.
Figure 15:
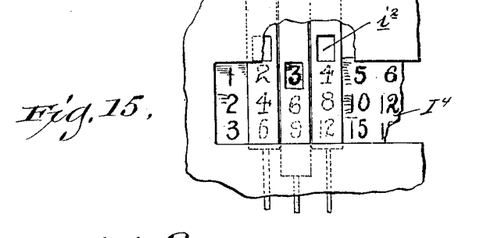
Fig. 15 is a broken elevation of a part of the indicating mechanism.
Figure 16:
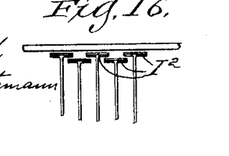
Fig. 16 is a broken plan view of a different form of indicating mechanism.
Figure 17:
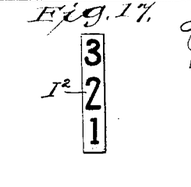
Fig. 17 is a separate view of one of the indicating-strips.

In the front of the casing, adjacent to the top thereof, is arranged a transverse slot or opening I, in rear of which a plurality of vertically-adjustable indicator-rods I' I' are arranged, each of said rods carrying at its upper end a target $I^2$, printed or otherwise marked with figures for designating the amounts of transactions and duplicates or triplicates of said amount, as shown more particularly in Fig. 17. The indicator-rods I' I' are provided with notches $i$ $i$ adjacent to their lower ends, and the rear ends of the bars C' C' are provided with suitable projections $i'$ $i'$ for engagement with said notches. Adjacent to the lower end of each of the indicator-rods I' I' is located a short guide-rod J, which, as shown in Fig. 4, is slightly bent at its upper end, and the rear ends of the bars $C^2$ C' are apertured so as to admit said guide-rods and permit of a vertical adjustment of said guide-rods thereon in an obvious manner. It follows, therefore, that upon a downward movement of one of the bars C' the projection $i'$ thereon will be brought into engagement with a notch in the side of the adjacent indicator-rod, and the rod thereby depressed. All of said rods are arranged to extend through a transverse bar $J^1$, upon which are located a corresponding number of spring-actuated pawls $j$ $j$, which serve to engage with the notches in the indicator-rods and to prevent upward movement thereof when the bars C' C' move upwardly. It follows, therefore, that a succession of operations of any one lever will cause the respective bar C' to successively engage with the notches upon the indicating-rod I' and to successively depress said rod, so that the retaining dog or pawl will successively engage with the notches therein and retain said rod in its lowest position. If, therefore, said rod has been actuated three successive times, the target $I^2$, carried thereby, will be adjusted to its lowest position and indicate three times the amount represented by a single actuation of the lever or key. In this manner in case a customer shall make a purchase of two or more articles amounting to, say, five dollars each and the cashier in making the registration of the transaction should operate the five-dollar key he may, by successive operations of said key, effect additional adjustment of the registering mechanism, so as to register the required amount or total and by the same movements of the lever or key adjust the same target so as to indicate the total amount of the transaction. In place of the targets printed with the figures or amounts, as shown in Fig. 17, the indicator-rods may carry strips $I^3$ $I^3$, which are blank upon their faces, but provided with suitable apertures $i^2$ $i^2$. In rear of said strips is provided in this particular form of construction a sheet $I^4$, which is printed with the several amounts and the multiples thereof and so arranged that the described step-by-step adjustment of the strips $I^3$ $I^3$ will successively display said amounts, the duplicates, and the triplicates thereof, according to the number of operations of the actuating keys or levers.

Upon the rear end of the cash-drawer $A^2$ is provided a suitable catch or hook K, adapted for engagement when said drawer is closed with a suitable detent $k$, by means of which said drawer is normally retained in its locked position. A transverse bar K' is arranged above the series of actuating-bars C' C', so that an upward movement of any one of said bars will serve to elevate said transverse bar K', said transverse bar being provided at its opposite ends with vertically-movable guide-rods $k'$ $k'$ for insuring a rectilinear movement of said bar. An upwardly-extending rod $K^2$ is engaged with the detent $k$ and is provided at its upper end with a projection $k^2$, arranged in the path of the bar K', so that as said bar reaches the limit of its upward movement it will engage with said projection and adjust said rod, so as to move the detent $k$ and free the drawer. The rod $K^2$ is normally pressed downward by a spring $k^3$, so as to normally hold the detent $k$ in engagement with the hook K. A rod $K^3$ extends forwardly through suitable guides and engages at its forward end with the rear end of the drawer and is pressed forward by a spring $k^4$, which when the drawer is freed serves to automatically press the same forward, so as to afford access to its interior in a familiar manner.

It will be understood from the foregoing description that after the registering mechanism has been actuated to register one or more transactions the indicating devices will remain in the position to which they have been adjusted when the last of said transactions was registered. In order to automatically return said indicating devices to their normal position, we provide upon each of the rods I' a spring $i^3$, which serves to normally elevate said rod, so that when said rods are freed they will be automatically raised by said springs to the uppermost limit of their movement and there retained until one or more of the actuating-levers are again operated to register an additional transaction.

It follows from the foregoing description that where a number of levers are used to make the registration of a single transaction the described movement of the first one of said levers will cause the drawer to be freed and permit the same to open. It becomes necessary, of course, to provide suitable means for retaining all of the indicating devices which have been used in registering a single transaction in their adjusted positions until such time as the next transaction is recorded. For this purpose we provide the rod $K^3$ upon its rear end with an inclined or wedge-shaped face L and arrange a lever or arm L' so as to engage with said face in the manner shown in Figs. 1 and 4 more particularly. A transverse bar $L^2$ is adjustably supported above the bar J', being conveniently engaged at its opposite ends with suitable guide-pins $l$ $l$, which permit of a slight degree of longitudinal adjustment of said bar. The lever L' is pivoted to said bar, as at $l'$, and extends upwardly therefrom for a considerable distance and is provided with an inclined or wedge face $l^2$ for engagement with a roller $l^3$ upon the bar K'. A suitable spring $L^3$ is engaged with the bar J' and the adjustable bar $L^2$ and serves to normally hold said bar at one limit of its adjustment. The guide-rods J J are mounted upon said bar $L^2$ and said bar is further provided with a plurality of downwardly-projecting pins $l^4$ $l^4$ for engagement with the pawls $j$ $j$ to simultaneously adjust all of said pawls by a longitudinal movement of said bar, so as to carry said pawls out of engagement with the notches in the bars I' I'. It follows also that such an adjustment of said bar will simultaneously move all of the ends of the bars C' C' so as to carry all of the projections $i'$ $i'$ away from the notched indicator-rods, and this adjustment of the pawls and the bars C' C' will obviously serve to automatically free all of the indicator-rods and permit the springs $i^3$ to return the same to their normal positions. If, therefore, the drawer be closed, as in Figs. 1 and 4, the lower end of the pivoted lever L' will be held out, as in Fig. 4, by means of the wedge-face upon the end of the drawer-ejecting rod or bar $K^3$, and when a key or lever is actuated so as to lift the bar K' the roller $l^3$ thereon will, by acting against the inclined edge $l^2$ upon said lever, serve to force said lever and the spring-retracted bar $L^2$ to the right, thereby effecting the release of all of the indicator-rods which may have been previously depressed. Inasmuch as this movement also frees the drawer when the bar K' reaches the upward limit of its movement, it will be seen that the lower end of the lever L' will be free and that said lever will be permitted to oscillate freely upon its pivotal support $l'$, so that upon the downward movement of the transverse bar K' the bar $L^2$ will be unaffected. It follows, therefore, that as the bar C' moves downward its projection $i'$ will be caused to engage with the respective indicator-rod, so as to depress the same and adjust the target to indicate the amount registered by said movement of the parts. It also follows that so long as the drawer remains open—that is to say, while all of the keys or levers used to register a single transaction are being operated and during the time necessary for the cashier to make change—the lever L' will hang free, and as many of the keys or levers as necessary may be operated in order to register the desired amount. It follows also that as soon as the drawer has been again closed the lower end of the lever L' will be again held for movement, so that upon the actuation of any one of the keys or levers, and the consequent upward movement of the transverse bar K', the described adjustment of the lever L' and the transverse bar $L^2$ will be accomplished and all of the indicator-rods thereby freed. It therefore follows that when the cashier begins the operation of the machine to register a transaction the indicator mechanism is automatically adjusted to its normal condition simultaneously with the actuation of the registering device by the first key operated and that upon the release of said key the appropriate indicating-target will be brought into view and that as many more keys or levers may be operated successively as may be necessary for the registration of the desired amount without affecting the adjustment of the first one or ones of the indicating devices used.

We will now describe our improved means for registering the number of transactions of different characters—such, for instance, as cash sales, money received on account, money paid out, and no sale, or cases in which the drawer is opened simply for the purpose of making change or for some other purpose not involving the receipt or payment of money.

In the front of the machine-casing are provided a suitable number of push-rods M, M', and M², carrying upon their outer ends suitable push-buttons $m$ $m'$ $m^2$, respectively, marked with appropriate characters to designate the natures of the respective transactions. The push-bar M' is designated for operation for transactions not involving the receipt or payment of money—such, for instance, as the making of change. This bar is engaged, as indicated in Fig. 1, with a plate $m^3$, having a diagonal or oblique slot $m^4$ for engagement with a pin carried by said push-rod, so that by an actuation of said rod said bar or plate will be elevated. Said bar or plate is engaged at its upper end with a suitable ratchet $m^5$, engaging with the toothed periphery of an indicating wheel or disk M³, which may be provided upon its face with any desired or convenient form of markings to designate the number of operations of the lever, said disk being conveniently located in rear of a plate provided with an aperture M⁴, (indicated by the dotted lines in Fig. 12,) and through which aperture the desired portion of the numbered or marked face of the disk may be viewed. By this means the disk or wheel M³ may be given an adjustment of one notch upon each actuation of the push-bar M', and will thereby serve to register the number of times that said bar has been actuated. A bell-crank lever N is operatively engaged with said push-bar and carries at its free end a link $n$, having a movable engagement with a vertically-movable bar N', said bar or rod being arranged to engage with and actuate the rod K² by having a connection K⁶ therewith, so as to lift bar K², and thereby free the detent $k$ and allow the drawer to open. Upon the side of the rod N' is provided a retaining-notch $n'$, adapted for engagement by a spring-controlled pawl $n^2$, which latter serves to hold said bar or rod in its elevated position. A suitable spring $n^3$ serves to return the push-bar to its normal position, and the slotted connection between the rod or bar N' and the link $n$ permits this return movement of the push-bar without affecting the adjustment of the bar or rod N'. The bar or rod N' carries at its upper end a suitable target N², which may bear any desired inscription, such as "No sale" or "Change," said target being so arranged that by the described upward movement of the bar or rod N' it will be brought into view through a suitably-arranged aperture or slot O in the top of the casing. It follows, therefore, that whenever it becomes necessary to open the drawer for any reason other than one requiring the receipt or payment of cash the target N² will be brought into view simultaneously with the freeing of the drawer and the indicating-disk M³ will be adjusted, so as to preserve a registration of the number of transactions of this nature. It may be desirable to limit the number of transactions of this kind, or in some cases to prevent the cashier from opening the drawer for any purpose other than for the receipt or payment of cash, and for this purpose we may employ a device such as is illustrated in Fig. 12, in which the registering-disk is provided at a convenient point with a notch $p$ for engagement with a dog or detent P, pivotally supported upon the machine frame and actuated by a suitable spring $p'$, whereby when said registering-disk has reached a desired limit of rotation said detent will be caused to automatically engage with said notch, and will thereby lock said disk from further movement. A suitable notch or shoulder is provided in the bar M', and said detent P is arranged to engage therewith simultaneously with its engagement with the notch $p$ in the disc, so as to also lock the push-bar against movement. It is therefore obvious that after a predetermined number of operations of the push-bar M' have been effected the detent P will automatically lock both the registering-disc and the push-bar from further operation, and that in case the proprietor prefers to permit the drawer to be opened only for transactions involving the receipt or payment of cash said detent may be placed in engagement with the disc and the push-bar, so as to effectually prevent any operation of the same.

In rear of the opening or slot O is located a stationary plate or target O', bearing a suitable inscription to designate the usual or most frequent kind of transaction—such, for instance, as cash sale—and for ordinary transactions or those involving cash sales the target O' will of course remain in view.

For the purpose of designating the characters of other transactions—such, for instance, as receipt of money on account or the payment of money from the cash-drawer—we employ additional targets O² and O³, respectively, which are carried by vertically-movable rods $o$ $o'$. The push-bar M is operatively connected, in the manner before described, with the rod $o$ by means of a bell-crank Q and a slotted link $q$, whereby a pressure upon said push-bar will serve to elevate the rod $o$ and the target $o^2$, carried thereby. The push-bar M² is similarly connected with the rod $o'$ by means of a bell-crank Q' and a slotted link q', an actuation of said latter push-bar serving in the manner before described to elevate the rod o' and the target O³, carried thereby.

The push-bar M has an engagement with a vertically movable plate or bar R, having an oblique slot r, engaging with a pin carried by said push-bar, whereby an actuation of said bar serves to move said plate or rod R upwardly in the manner before described. The upper end of said bar or rod R is operatively connected with a suitable ratchet R', engaging with the toothed periphery of the registering-disk R², and adapted by the described actuation of the push-bar to adjust said disk in an obvious manner, so as to cause a registration of the number of transactions of the character designated by the target which is carried by the rod o. Similarly, the push-bar M² is connected with a vertically-movable bar or plate R³, having an oblique slot r³, said latter bar or rod being arranged to actuate a lever R⁴, carrying a ratchet r⁴ for engagement with the toothed periphery of a registering-disk S.

The disks R² and S may be arranged to register, respectively, transactions of any desired natures—as, for instance, one disk may be used for registering the number of transactions in which money has been received on account and the other disk for registering the number of transactions involving the payment of cash from the cash-drawer. The targets O² and O³ will of course bear corresponding markings or lettering, so as to indicate to the customer the nature of the transaction registered by the cashier. The rods o and o' are provided with notches s and s', respectively, adapted for engagement when the said rods are elevated with pawls S' and S², which pawls serve to retain said rods and the targets carried thereby in their elevated positions. It becomes necessary, therefore, to provide suitable means for automatically returning the targets to their normal position by the actuation of the levers or keys or to return one of said targets to its normal position by the actuation of the push-bar, which adjusts another of said targets. For this purpose the vertically-movable bar K' is provided with a double-faced cam T, arranged to pass between the free ends of the pawls n² upon one side and the pawls S' S² upon the other, so that by the engagement of said cam with said pawls the free ends of the pawls will be pressed outwardly and the rods N', o, and o' thereby freed and permitted to drop.

We prefer also to provide suitable means for insuring the actuation of the push-bars M and M² and the indicating and registering mechanism connected therewith for each transaction of the nature designated by the respective push-bars, and for this purpose we provide upon the inner end of the bar M a suitable inclined or wedge face t and upon the bar M² a similar inclined or wedge face t', terminating in notches t² and t³, respectively, for engagement with lateral projections T² and T³ upon a vertically-movable bar or plate T'. This bar or plate T' is loosely supported at its upper end upon a suitable pin t⁴ and is arranged to swing laterally with respect to said support or to have a suitable degree of vertical adjustment thereon, a spring t⁵ serving to normally hold the lower or free end of said bar against the central frame-piece, which supports the push-bars and the connected mechanism. The lower end of the bar or plate T' is arranged to engage with the inner or rear end L of the bar K³. Said bar is provided in addition to the laterally-disposed wedge or inclined surface with an upwardly-inclined face U, adapted to engage with and lift the bar T' when the drawer is closed. Immediately in rear of the upper edge of the face U is a depression u, provided with a curved face u'. The arrangement of these parts is such that when the push-bar M or M² has been operated and the projection T² or T³ upon the plate T' has been engaged therewith the push-bar and the connected indicating mechanism will be temporarily held stationary, the target indicating the nature of the transaction remaining in view. Now when the appropriate key or keys have been operated to register the amount of the transaction and the drawer thereby freed the forward motion of the bar K³ will bring the inclined or curved surface u' into engagement with the free lower end of the plate T', and said plate will thus be caused to swing slightly outward and to thereby permit the free forward movement of the bar K³ and the opening of the drawer. As soon as the plate T' has been freed from engagement with the bar K³ the free lower end of said plate will be returned to its normal position, when by closing the drawer the inclined face U upon the bar K³ will be pressed beneath the plate T', so as to elevate the same and free the push-bar from engagement therewith. This permits the push-bar to be returned to its normal position by the retracting-spring n³, but leaves the indicating-target which designates the nature of the last transaction registered in its elevated position until the next operation of a lever or key and the described upward movement of the vertically-adjustable bar K' and the consequent engagement of the cam T with the pawls n², S', and S². It will be understood that records of the transactions other than cash sales or the making of change will be made upon appropriate strips or ribbons of paper in the manner described in our aforesaid prior patent, so that the amounts of cash received on account or cash paid from the cash-drawer may be ascertained by inspection of said record strips or ribbons. This feature, however, forms no part of our present invention, and inasmuch as it is fully described in our aforesaid prior patent we do not deem it necessary to describe the same in detail herein or illustrate it in the drawings.

As a further and separate improvement we prefer to provide suitable means for simultaneously locking all of the moving parts of the apparatus against movement, so that after the close of a day's business the proprietor or cashier may securely lock the machine, so as to prevent the operation of any part or parts of the same or an alteration of the record of the day's business which has been made. For this purpose we find it convenient to employ the means shown in Figs. 1, 3, 4, 7, and 11 of the drawings more particularly. This locking device comprises a suitable horizontally-disposed longitudinally-adjustable bar V, which is arranged to engage at one end, as at $v$, with a notch $v'$ in one of the vertically-adjustable bars $k'$, which are connected with the vertically-movable bar K', extending horizontally above the series of actuating-bars C'. At or adjacent to its other end the horizontally-movable bar V is notched, as at $v^2$, and provided with a laterally-extending lip V' for engagement with a notch $v^3$ in the other vertically-adjustable bar $k'$. The bar V is secured adjustably to a horizontally-extending rigid bar W by means of one or more pins or screws $w\ w$, extending through slots $w'\ w'$ in the bar V. A lock W' is provided in one end of the machine, its keyhole communicating with the exterior of the machine-casing in a familiar manner and its bolt $w^2$ being provided with a wedge face for engagement with an inclined face $V^2$ upon one end of the bar V, whereby by the actuation of the said bolt the bar V may be crowded or forced longitudinally into engagement with said notches $v'$ and $v^3$ in the vertically-movable bars $k'\ k'$, and it follows that by this adjustment the two bars $k'$ and the horizontal bar K' will be securely locked against vertical movement, and said latter bar resting upon the actuating-bars C' C' will serve to lock all of said bars against movement. It is desirable also in this connection to secure the push-bars M M' M² against movement at the same time that the bars connected with the registering mechanism are locked, and for this purpose a suitable locking-lever X is pivoted, as at $x$, to the machine-frame and has a pivotal connection at one end with a depending lug $x'$ upon the adjustable bar V, whereby the described longitudinal adjustment of said bar will serve to oscillate said lever upon its pivotal support. The lower or free end of said lever is arranged, as shown more particularly in Fig. 11, to rest adjacent to the push-bars M, M', and M², so that when the movable bar V is adjusted to secure the registering and key mechanism against actuation said free end of the lever X will be caused to engage with notches $x^2\ x^2$ in said push-bars, so as to secure all of the same against movement. It follows from this construction, therefore, that by the operation of the lock W' all of the parts of the machine will be simultaneously locked against further movement, so that it would be impossible for unauthorized persons to in any way tamper with the adjustment of the parts or to in any way alter the registration of the transactions which has recently been made.

Figure 3:
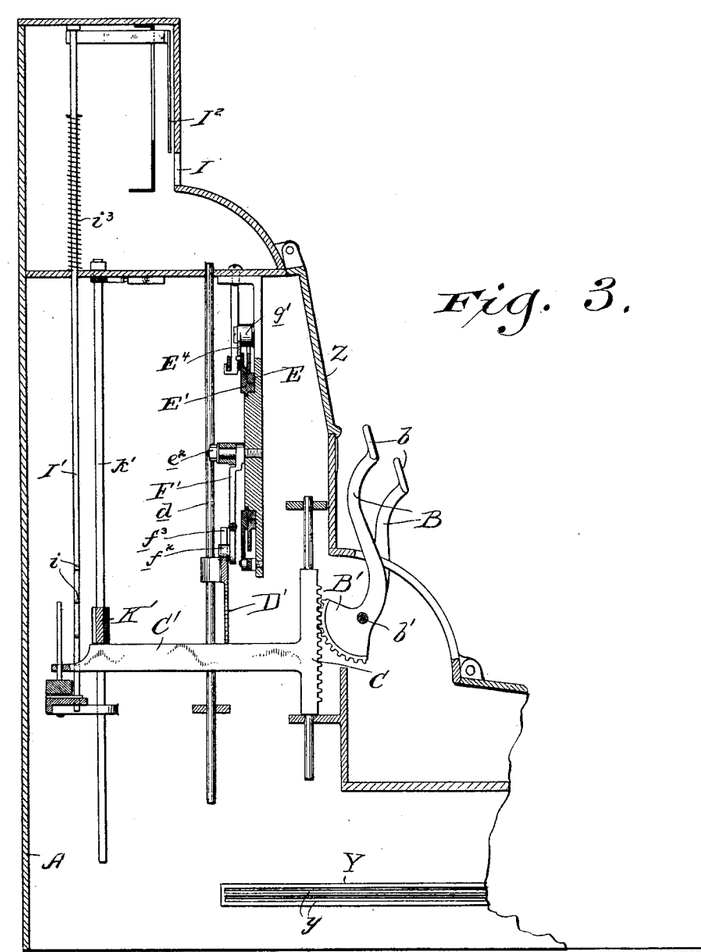
Fig. 3 is a vertical sectional view taken on line 3 3 of Fig. 2.

As a further and separate improvement we prefer to arrange cash-drawer A² upon ball-bearings, as is indicated in Figs. 2 and 3 more particularly, in which track-ribs Y Y are provided upon the end walls of the casing and are provided with longitudinal grooves $y\ y$ for the reception of antifriction-balls $y'\ y'$, the sides of the cash-drawer being provided with bearing-ribs $y^2$ for engagement between the upper and lower series of antifriction-balls. It follows, therefore, that the movements of the cash-drawer in opening and closing the same will be rendered free and comparatively frictionless.

The machine-casing is provided, as shown in Figs. 1 and 3 of the drawings, with a hinged lid or cover Z, secured by a lock $z$ and capable of being opened to display the register mechanism, which shows the total of the various transactions, as well as the tally mechanism, which shows the number of transactions of the various kinds which have been recorded.

It will of course be understood that in the use of our new register the adding or registering mechanism makes a total registration of all of the transactions involving cash sales, money received on account, or money paid out, while the tally mechanism preserves the registration of the number of each kind of transaction other than the usual or most common transactions—such as cash sales, for instance. As before explained, memoranda of the details connected with said transaction involving the receipt of money on account or the payment of money from the cash-drawer are preserved upon the record strips or ribbons of paper, and it will be understood that at the close of a day's business the number of such entries should tally with the number of transactions of the same nature recorded by the tally mechanism within the casing. In order to ascertain the amount of cash sales, it is only necessary to deduct from the total record of all of the transactions the amounts upon the tally-slips used for recording the details of transactions involving money received on account or money paid out.

It will of course be understood that in the construction of our improved cash-register any suitable characters or inscriptions may be provided either upon the portions $b\ b$ of the actuating-levers or upon convenient points or portions of the front casing of the machine, said characters or inscriptions being of such a nature as to designate the several denominations of the keys and of the amounts received or paid out by the cashier and recorded by the machine.

Having thus described our patent, what we claim as new, and desire to secure by Letters Patent of the United States, is—

1. A cash-register comprising a ratchet register-wheel, an arm pivoted to the axis of said wheel, and carrying a pawl engaging with the teeth of the latter, a vertically-movable plate beneath the free end of said arm and in engagement therewith, and provided with an upwardly-curved projection, eccentric to said wheel, for producing a variable movement of said arm, and actuating-levers for operative engagement with said plate to produce a variable, vertical movement thereof, substantially as described.

2. A cash-register comprising a plurality of ratchet, register-wheels mounted upon a common axis, an arm adjacent to each of said wheels and pivotally connected at one end with said axis and carrying a spring-controlled pawl for engagement with the teeth of the respective wheel, a vertically-movable plate beneath each of said arms and provided with an upwardly-curved bearing-surface, eccentric to the pivotal support of the arm, a series of steps or notches formed in the lower edge of said plate, vertically-movable lifting-bars for engagement with said steps or notches, a plurality of actuating keys or levers operatively engaged with said lifting-bars for producing a vertical movement of the latter and a variable movement of said plate, an auxiliary adjusting device adjacent to one of said wheels and comprising a pivoted plate or lever carrying a spring-actuated pawl for engagement with the teeth of another wheel and a plurality of equidistant projections or pins upon the first-mentioned wheel, for periodically actuating said plate or lever to adjust the other wheel, substantially as described.

3. A cash-register comprising a ratchet, register-wheel, a pawl-carrying lever for moving the same, a vertically-movable plate beneath said lever and engaging with the free end of the same, and provided with a curved bearing-face for producing a variable movement of said lever, a plurality of steps or notches in the lower edge of said plate, a plurality of vertically-movable lifting-bars, actuating levers or keys and with which the lifting-bars engage and adapted to produce variable movement of said plate, guide-rods engaging with the rear ends of said lifting-bars and adapted to carry the same out of their normal position upon the initial movement thereof, and vertically-movable rods provided with notches or shoulders arranged to extend into the return-paths of the movement of said bars, substantially as described.

4. A cash-register comprising a plurality of lifting-bars, actuating levers or keys operatively engaged therewith, register-actuating mechanism operated by said lifting-bars, a series of vertically-movable spring-supported rods, each carrying at its upper end an indicating-target, and provided adjacent to its lower end with one or more notches or shoulders, means for carrying each of the lifting-bars out of its normal line of movement upon its initial or upward movement and for permitting it to return to said normal line of movement and to engage with the notches or shoulders in said vertically-movable rods to depress the same upon its return movement, dogs or pawls for engagement with said notches or shoulders to hold said rods in their depressed positions, a horizontal, longitudinally-movable bar operatively engaged with all of said pawls, a depending lever pivotally connected with said bar, a cash-drawer-opening device, an arm or bar connected with the cash-drawer-opening device and adapted for engagement with the lower end of said lever when the drawer is closed, and means, actuated by the lifting-bars and having operative engagement with the upper end of said lever and adapted for actuation when the lower end of said lever is in engagement with said drawer-opening device, to adjust said lever laterally and to thereby free all of said retaining-pawls from engagement with the respective rods, substantially as described.

5. A cash-register comprising a plurality of lifting-bars, actuating levers or keys, a horizontal bar extending above and adapted for engagement with all of said lifting-bars, a plurality of vertically-movable rods, each carrying at its upper end an indicating-target, and provided at its lower end with one or more notches, a horizontally-disposed, longitudinally-movable bar adjacent to said rods, a plurality of guides operatively engaged with the rear ends of said lifting-bars and adapted to carry the same away from the notched portions of said vertical rods upon the initial movement of said bars, and to permit of the engagement of said bars with said notched rods upon the return movement of the former to depress the respective rods, pawls for retaining said rods in their depressed position, and having operative engagement with said horizontally-movable bar, a drawer-opening device, a lever pivotally secured to said bar and adapted for engagement at its lower end with a drawer-opening device when the drawer is in its closed position, but arranged to depend freely from its support when the drawer is open, and a device carried by the vertically-movable bar and adapted for engagement with the upper end of said lever by an actuation of any one of the lifting-bars, substantially as described.

6. In a cash-register the combination with registering mechanism of a series of actuating levers or keys, a corresponding number of lifting-bars having rack-and-pinion engagement with said levers, register-actuating mechanism for operative engagement with said bars, target-displaying devices adapted to be moved by movements of said bars, means for temporarily retaining said target-displaying devices in their adjusted positions, a horizontally-disposed, vertically-movable bar adapted to be elevated by the initial movement of any one of said bars, a drawer-retaining device for normally holding the cash-drawer locked, a spring-actuated bar for automatically opening the drawer when said retaining device is freed, a pendulous lever operatively engaged with the devices which lock the target-displaying devices, and adapted for engagement when the cash-drawer is closed, with the drawer-opening bar, and a device carried by said vertically-movable transverse bar, and adapted for operative engagement with said pendulous lever when the latter is in engagement with said drawer-opening bar, so as to actuate the same to free all of the target-displaying devices by the initial movement of any one of the actuating-keys and lifting-bars, substantially as described.

In testimony whereof we sign this specification in the presence of two witnesses.

FRED J. PETERSEN.
WILLIAM C. EBERHARDT.

Witnesses:
ADAM WOLF,
C. H. M. PETERSEN.